United States Patent [19]
Kaarstad et al.

[11] Patent Number: 5,845,602
[45] Date of Patent: Dec. 8, 1998

[54] DEVICE FOR LOWERING AND RAISING A FISH REARING UNIT

[76] Inventors: Charles Kaarstad, Skolevn, 13-A; Harald Volden, Simanes, both of N-9500, Alta, Norway

[21] Appl. No.: 875,758
[22] PCT Filed: Feb. 5, 1996
[86] PCT No.: PCT/NO96/00027
    § 371 Date: Oct. 14, 1997
    § 102(e) Date: Oct. 14, 1997
[87] PCT Pub. No.: WO96/24245
    PCT Pub. Date: Aug. 15, 1996

[30] Foreign Application Priority Data

Feb. 10, 1995 [NO] Norway .................................. 950524

[51] Int. Cl.⁶ .................................................. A01K 61/00
[52] U.S. Cl. .......................................................... 119/223
[58] Field of Search ..................................... 119/208, 223, 119/238, 239, 240

[56] References Cited

U.S. PATENT DOCUMENTS

| 4,244,323 | 1/1981 | Morimura . | |
| 4,257,350 | 3/1981 | Streichenberger . | |
| 4,312,296 | 1/1982 | Stelleman . | |
| 5,299,530 | 4/1994 | Mukadam et al. | 119/223 |
| 5,477,813 | 12/1995 | Lien | 119/223 |

Primary Examiner—Robert P. Swiatek
Assistant Examiner—James S. Bergin
Attorney, Agent, or Firm—Dennison, Meserole, Pollack & Scheiner

[57] ABSTRACT

A float collar, comprising inner and outer float rings mounts the fish rearing unit for selective raising and lowering utilizing valve controlled air and water inlets and outlets leading to internal chambers within the float rings arranged symmetrically relative to a diametric axis of the float collar.

8 Claims, 9 Drawing Sheets

DEVICE FOR LOWERING AND RAISING A FISH REARING UNIT

BACKGROUND OF THE INVENTION

The invention relates to a device for lowering and raising a fish rearing unit,

Fish and their related rearing equipment located in the ocean can be subject to undesirable changes in the environment, such as the infestation by algae or jellyfish, oil spillages, hurricanes, or from covering by ice and floating ice. All of the aforesaid changes in the environment have resulted in heavy losses for the fish rearing trade. So far, in such cases, fish farmers have had three options for preserving the value of the fish rearing plant:

1) slaughtering the fish stock,
2) relocating the rearing equipment to a different area,
3) lowering the net cage to below the threaten area.

The first two options have been unsatisfactory for fish farmers, due to the large economic losses incurred. The third option has been shown to be useful in situations wherein the undesirable change in the environment was caused by algae or jellyfish infestation or by an oil spillage. However, the third option has not proved useful when the undesirable change in the environment was caused by ice covering, floating ice or by hurricanes.

On the market today are closed PVC-rearing units in which water is pumped up from deep water. These units utilize the principle of transporting clean water up to the fish, and keeping the units separate from the environment by using a unit with a closed PVC-cloth. There are also other known solutions in which the rearing unit is lowered, with a float ring/cage using air-filled, closed boxes as part of the float ring. This is stated in NO patent publication 150.741, GB patent publication 2.008.912, DE patent publication 2.713.268, SE patent publication 458.088, NO patent publication 173 681.

Common to all these publications, except the last one, is the feature that both the rearing unit and float ring should be lowered. The fish farmers thus cannot use existing rearing equipment. NO patent publication 173 681 gives the fish farmer an opportunity to utilize all existing equipment, but is not a good solution when the undesirable change in the environment is caused by hurricanes floating ice or b covering by ice.

In NO patent publication 173 681, forces induced by waves will propagate down to the net cage, exposing it to stress. Floating ice is not avoided in NO 173 681, because the floating ice will interfer with the raising/lowering system, and even destroy the raising/lowering system.

SUMMARY OF THE INVENTION

It is therefore an object of the present invention to provide a device for the protection of rearing fish and the related equipment against local changes in the environment, without the disadvantages existing in known devices.

A device according to the present invention may form part of the preparation for each rearing installation in order to reduce risks and losses due to rapid environmental changes in the upper part of the ocean. In preparation for a hurricane forecast, the entire installation may be submerged in order to avoid the stress from the water body that is driven through the installation in the shape of waves.

By means of present invention, the fish farmers may utilize existing rearing equipment, such as float collars, rearing units and mooring equipment. Furthermore, it is not neccesary to drag the installation away when the undesired change in the environment is caused by algae or jellyfish infestation, oil spillage or risk the installation being damaged by hurricanes, covering by ice or by floating ice. The installation is also better secured against theft if the fish farmer has the rearing units lowered in periods without supervision. Another aspect is that new locations in open and unsheltered stretches of coast can be utilized, as the installation may be lowered under the level at which the wave forces are great, and thus reduce the total stress on the installation and mooring.

The equipment of the present invention can be assembled by two people. The equipment is mounted on the float collars onshore. The mounting procedure is accomplished before the float collar is placed on the sea, or the existing float collars should be taken onshore before the mounting procedure begins. When the float collar is divided in order to reassemble the equipment, the expanded polyester or other materials that are used to provide extra buoyancy in the float rings should first be removed. The assembly time for two men is approximately 8 hours per float collar. Thus, equipment that makes the float collar submersible, may contribute to reducing the total cost of the rearing installation due to the above mentioned changes in the environment.

The invention will now be described using an example of a preferred embodiment, and with reference to the accompanying drawings, in which:

DESCRIPTION OF PREFERRED EMBODIMENT

Figure 1:
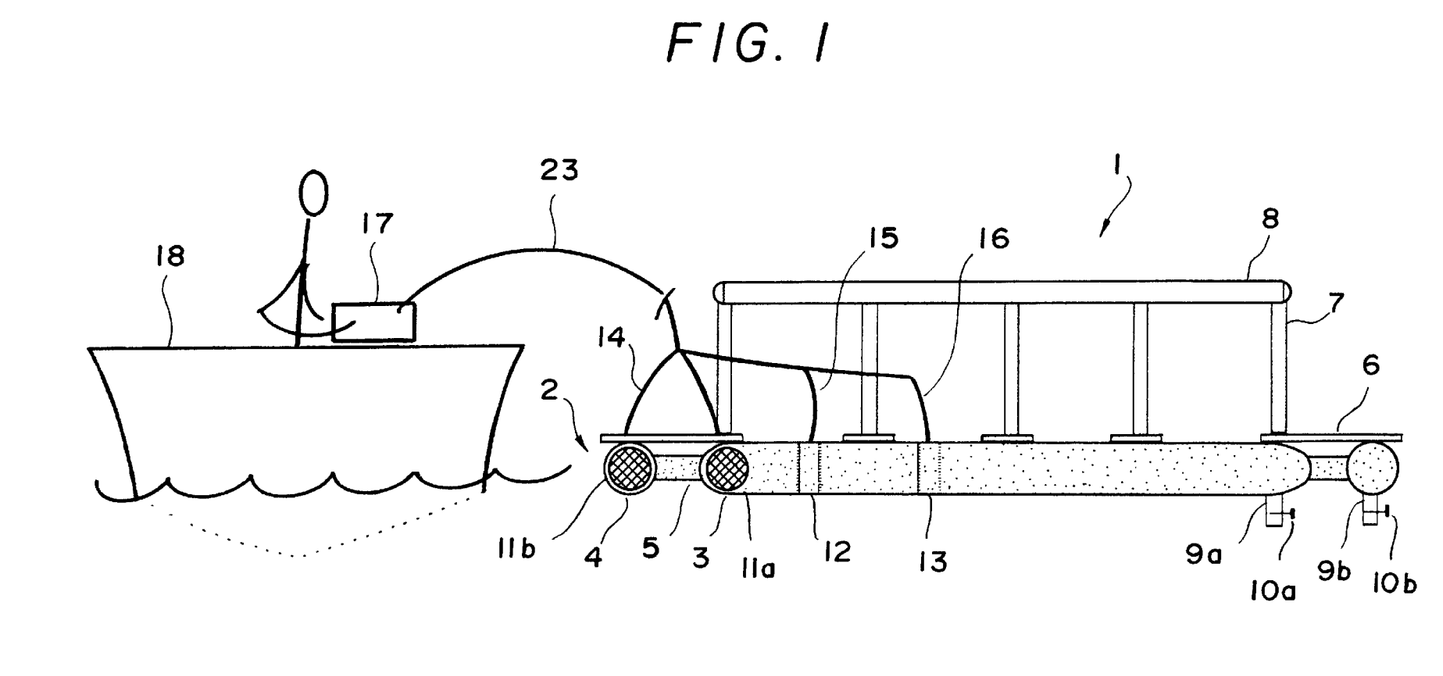
FIG. 1 shows a submersible rearing unit according to the present invention in a side view and partly in section.

FIG. 1 shows a side view of a device according to the present invention. A rearing unit 1 comprises a float collar 2, which comprises an inner tubular float ring 3 and an outer float ring 4. The float rings 3, 4 are mutually connected by connection bars 5. On the float rings 3, 4 is disposed a gangway 6, and a jumping fence 7 is fixed to the inner ring 3. A hand rail 8 is situated at the top of the jumping fence 7, and the jumping fence 7 is preferably perforated in order to simplify the lowering of the float collar 2.

At an arbitrary location on the circumference of the float rings 3, 4 are arranged water charging or control means 9a, 9b, with respective valve mechanisms 10a, 10b for the controlled flow of water into and out of the float rings. Diametrically opposite the water control means 9a, 9b are situated air relief means 11a, 11b, 12 and 13, which are connected to flexible air relief tubes 14, 15, 16 which lead to a control unit 17. The control unit 17 is operated from a boat 18.

Figure 2:
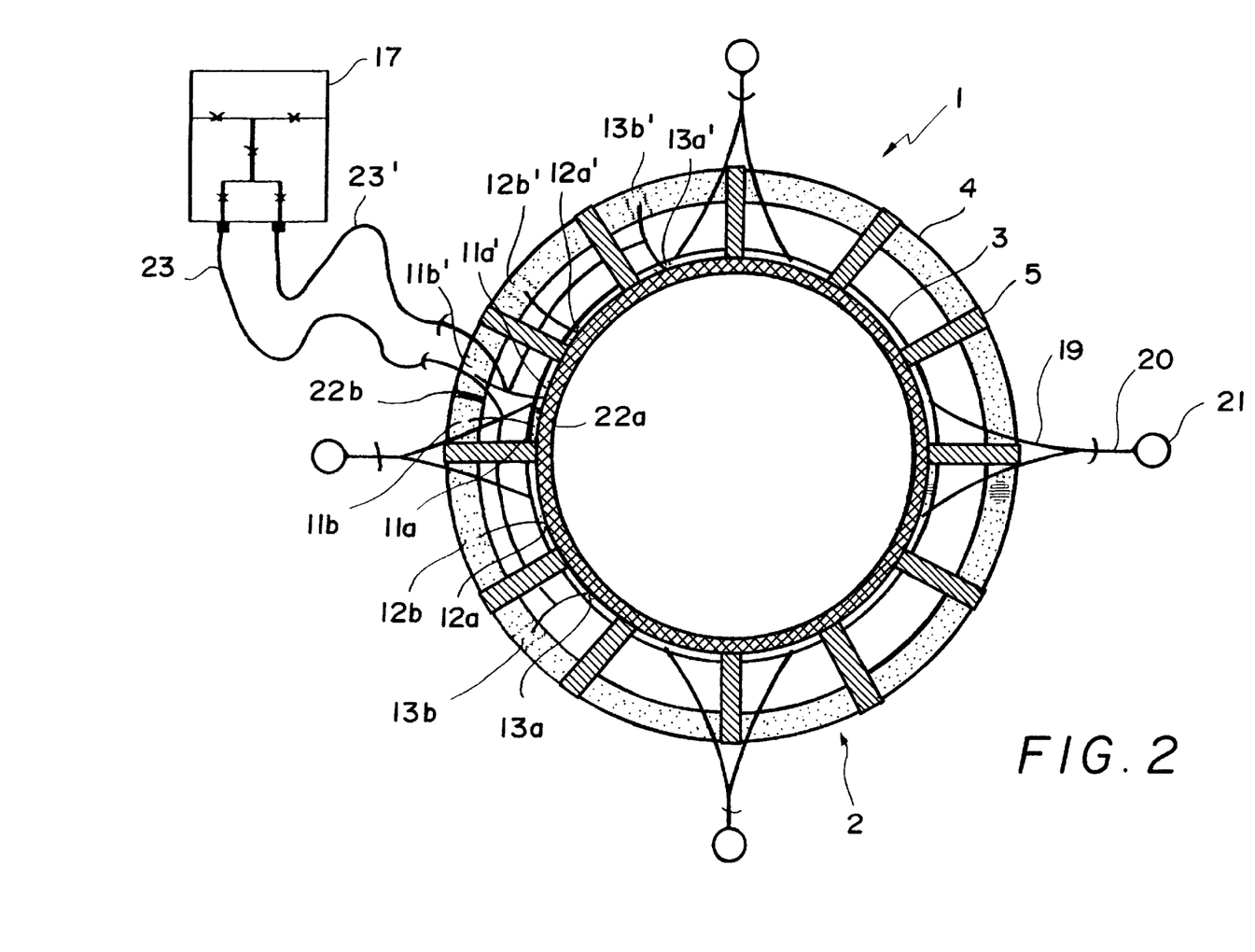
FIG. 2 shows the rearing unit in a top view.

FIG. 2 shows the device from above. Air relief means 11a, 11b, 12a, 12b and 13a, 13b can be seen. In order to achieve a balanced lowering of the rearing unit 1, further air relief means 11a', 11b', 12a', 12b' and 13a', 13b' are arranged in mirror symmetry with respect to the diameter passing through the water control means 9a, 9b. Air relief means 11a, 11a', and 11b, 11b', respectively, are separated with respect to air-tight and water-tight partitions 22a, 22b.

A number of crowfeet 19 are connected to the inner ring 3. The number of crow feet 19 is dependent on the circumference of the float collar 2. A supporting rope 20 is connected to each of the crow feet 19. The length of the support rope 20 is adjustable. A float 21 is connected to each of the support ropes 20. The floats 21 must have a buoyancy that exceeds the weight of all the equipment that is submerged.

The floats 21 may also be provided with a device (not shown) which makes possible lowering/raising from each of the floats. This device may be a winch that is driven by hydraulics, pneumatics or by electricity. By such an arrangement the use of a crane or a capstan in a fish farming boat it is avoided.

Figures 3, 4, 6:
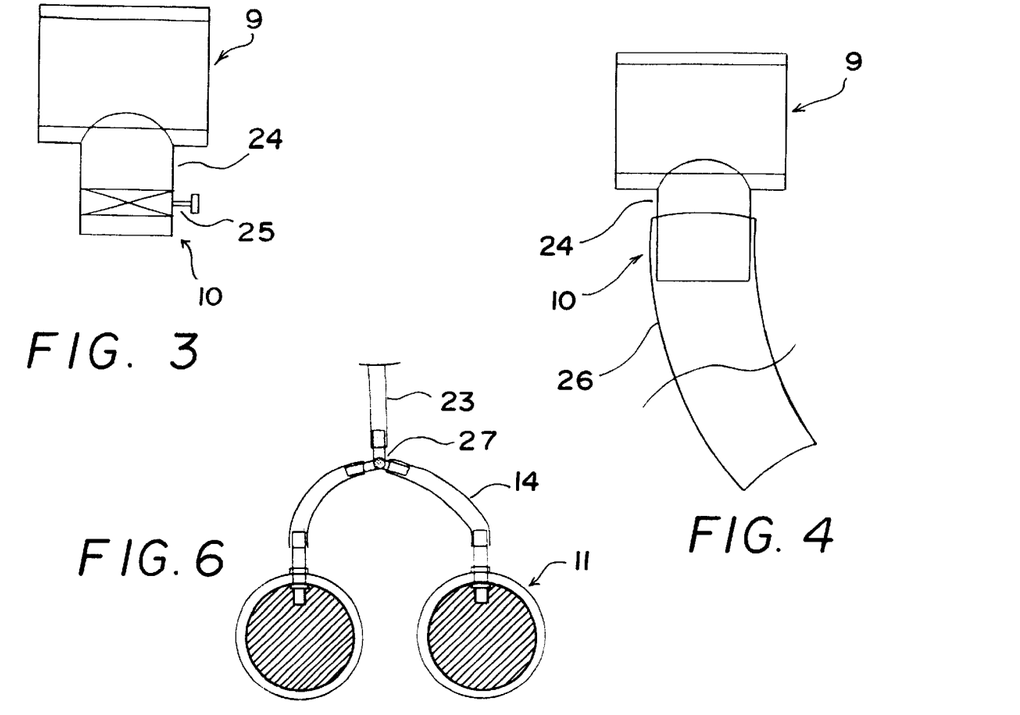
FIGS. 3 and 4 show water charging means for use in the rearing unit.
FIGS. 5 and 6 show first air relief means for use in the rearing unit.

FIGS. 3 and 4 show two alternative water control means 9, having valve mechanisms, generally denoted 10. The water control means 9 comprises a tube section having the same dimension as inner float ring 3 and outer float ring 4. The tubular section is equipped with a hole which is connected to a pipe socket 24. In the pipe socket 24 is a closure 25 (FIG. 3) or a hose 26 (FIG. 4) which forms the valve 10 for opening and closing the water control means of the float collar 2.

Figure 5:
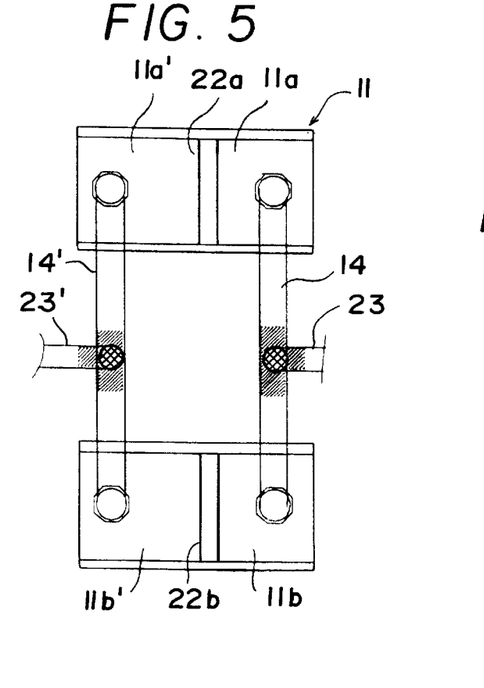

In FIGS. 5 and 6 there is shown an air relief means 11, viewed from above and in section, respectively. A tubular section of the same dimension as inner float ring 3 and outer float ring 4 is separated into two chambers 11a, 11a', and 11b, 11b', respectively, by a partition 22a, 22b. Flexible pipes 14, 14' are connected to the chambers, by means of a connector 27 which is connected to connecting tubes 23, 23' (FIG. 2) of the control unit 17. The tubular sections are connected to inner and outer float rings 3, 4 by means of welding or screw coupling.

Figure 7:
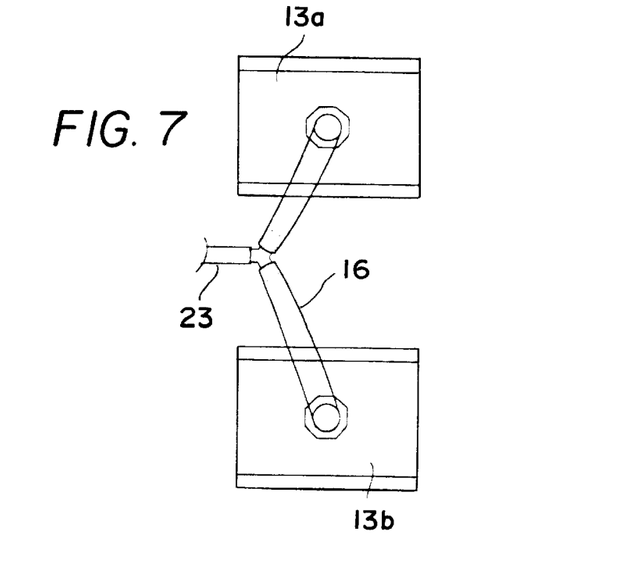
FIG. 7 shows second air relief means for use in the rearing unit.

The air relief means 11 is situated on the float collar 2 diametrically opposite the water control means 9. On both sides of the air relief means 11 are located additional air relief means 12, 13. FIG. 7 illustrates how these are designed. They are mainly constructed as the central air relief means 11, but comprise one single chamber without a partition.

The number of air relief means 11, 12, 13 that are used and the distances therebetween are dependent upon the circumference of the float collar 2. The air relief means contributes to balancing the rearing unit 1 during lowering, and at the same time ensure rapid movement of air. In view of the balancing, it is important that the fluid-tight partitions 22a, 22b (FIG. 2) prevent air passage between the chambers, so that the volume of air on the respective sides can be controlled by the control unit 17.

Figure 8:
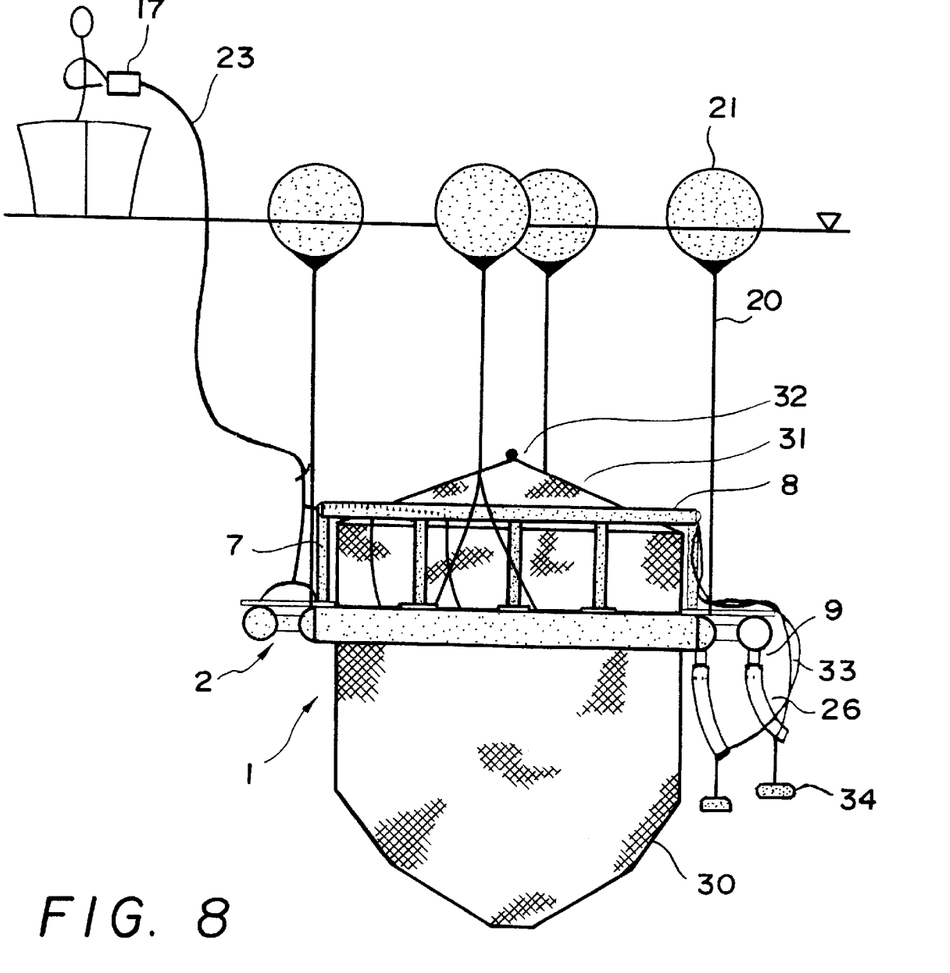
FIG. 8 shows the rearing unit submerged to a first level.

FIG. 8 shows the rearing unit 1 in a submerged position. A net bag 30 that is connected to the jumping fence 7 forms a barrier for the fish in the rearing unit 1 during normal operation. Before submersion, a top net 31 is connected to the jumping fence 7 of the net bag 30, so that it becomes a closed unit. The top net 31 should be of the same kind of thread and the same mesh as the net bag 30, this is to avoid the fish escaping when everything is submerged. In the center of the top net 31 is mounted a float 32 which should hold the top net 31 up in the center of the rearing unit when it is lowered.

FIG. 8 also shows how the water control means 9 functions as a water lock or valve. When the float collar 2 is to be lowered, the valves 25 are opened, or the hoses 26 are dropped into the water. The hoses are pulled downwards by means of weights 34 hanging by ropes 33.

Figure 9:
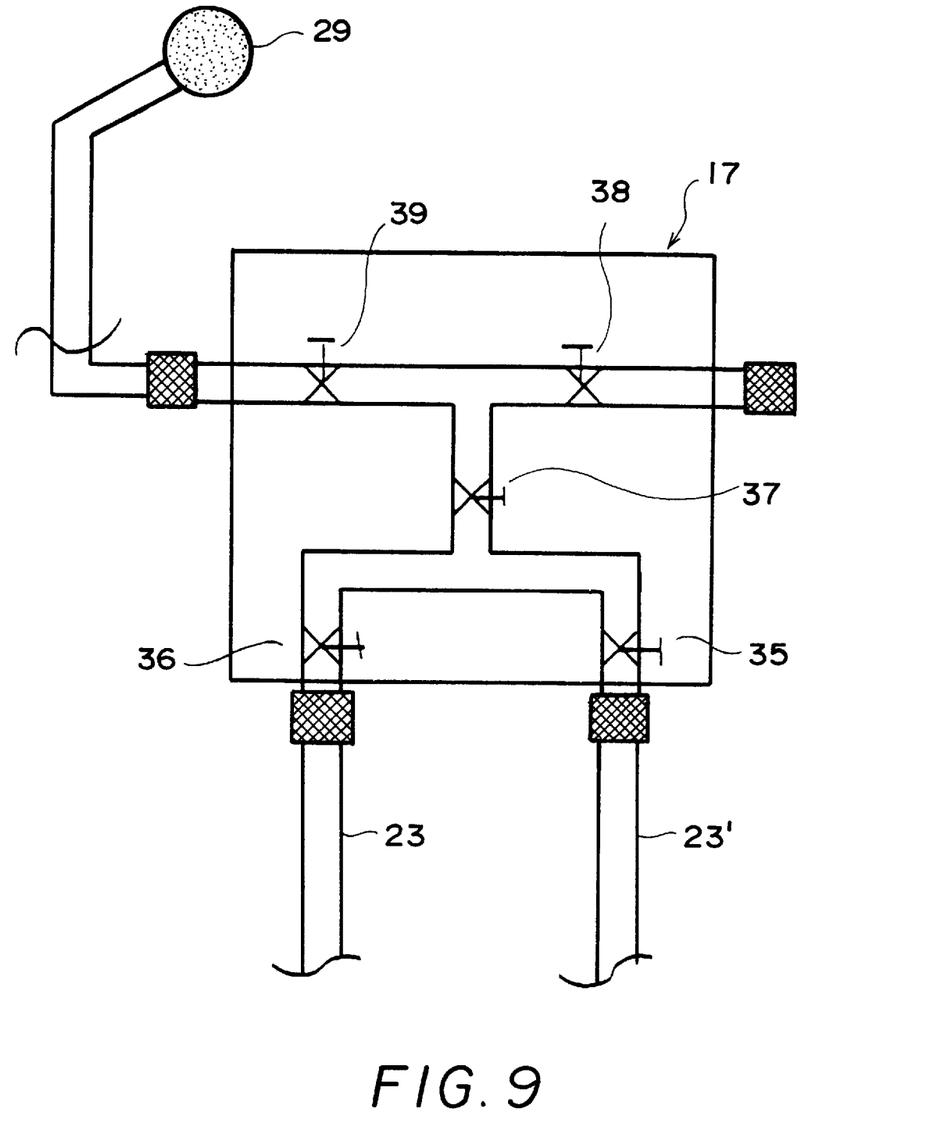
FIG. 9 shows the control unit for controlling the lowering/raising of the rearing unit.
Figure 10:
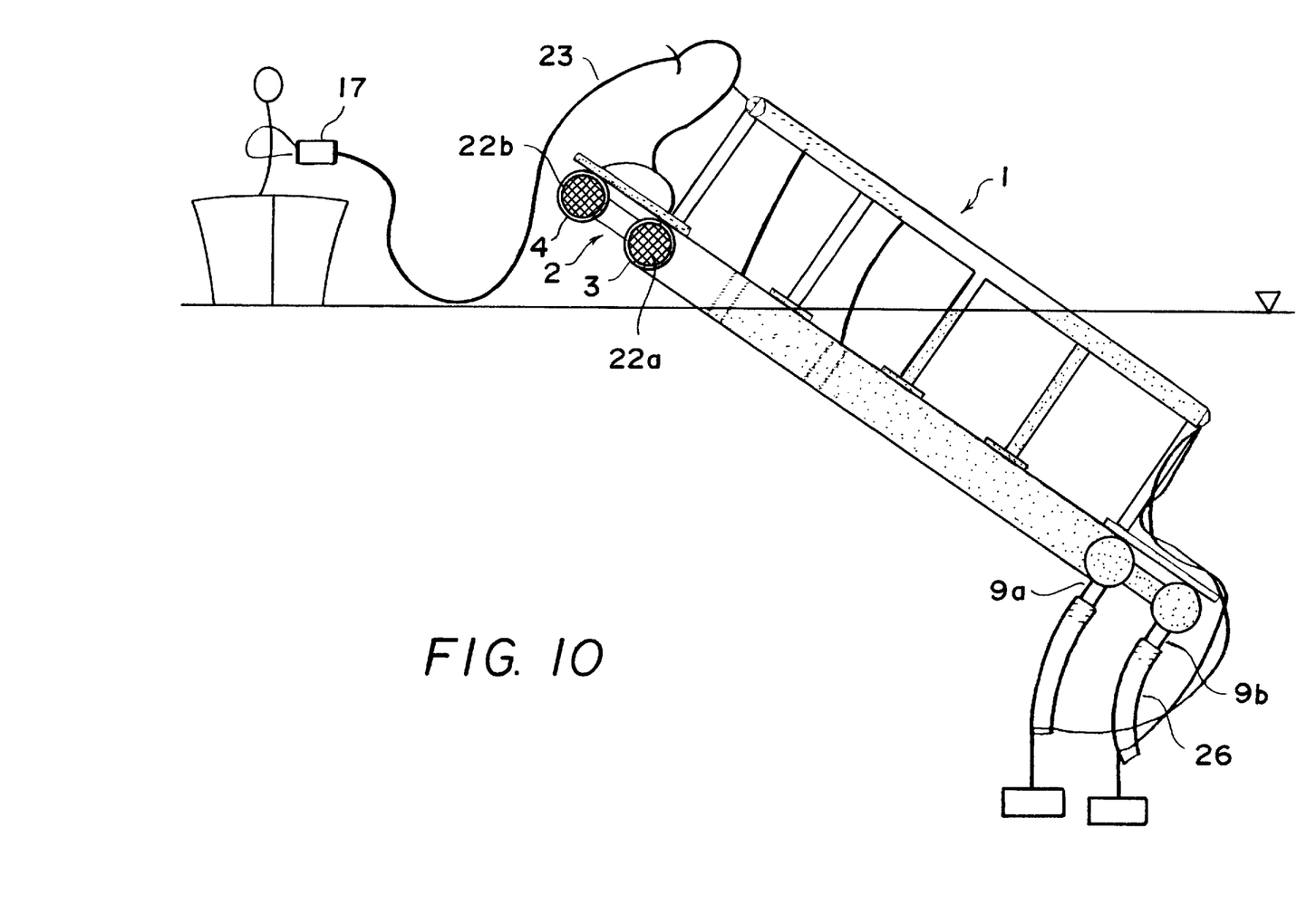
FIG. 10 shows the rearing unit during lowering/raising.

The control unit 17 is illustrated in detail in FIG. 9. It comprises a number of interconnected tubes that are controlled by valves 35–39. Further an air compressor 29 is used during raising of the float collar 2. The function of the control unit 17 is as follows. During deflation the valves 35, 36, 37 and 38 are kept open and the valve 39 is kept closed. The air in the float collar 2 is evacuated through the open valves. When the water control means has brought the float collar 2 30 under the water line, as shown in FIG. 10, two separate variable air chambers are formed. Now it is possible to control the balance of the float collar 2 during further lowering.

Because there is a deflated float ring, imbalance in the weight distribution of the float collar 2 will make the float collar tilt to one side seen from the deflating member 11. This makes it possible to remove all of the air from the float collar 2. The air relief means 12, 13, and 12', 13' on each side of the air relief means 11, makes it possible to empty water that would have been left from the lowering procedure.

FIG. 10 shows the first part of the lowering or the last part of the raising of the float collar 2. Between the partitions 22 and the water surface inside the float rings 3, 4, a chamber having a variable volume will be formed. Depending of which side the float collar 2 sinks, the correction can be made by controlling air discharging from the two chambers by means of the control valves 35 and 36 of the control unit 17.

The depth of the float collar 2 can be regulated by adjusting the length of the supporting ropes 20. A first depth level is determined by the diameter of the float collar 2. In order to avoid the net bag 30 being deformed too much during lowering/raising, the length to which the supporting ropes are initially adjusted should not exceed half the diameter of the float collar 2. This results in approximately 45° deformation of the net bag when the water control means 9 is submerged to the first level and the air relief means is at the surface.

Figure 11:
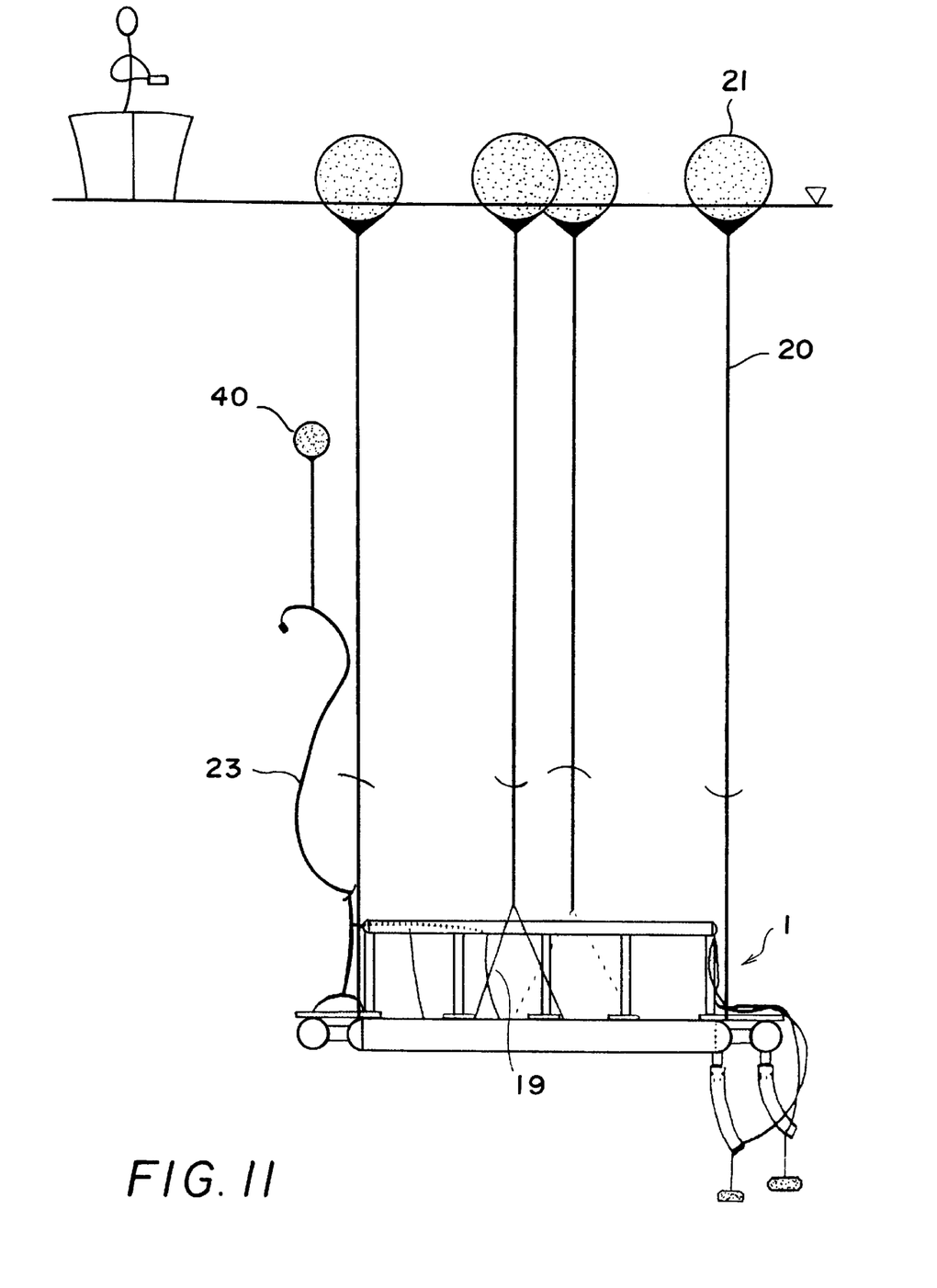
FIG. 11 shows the rearing unit submerged to a second level.

FIG. 11 shows how the connecting tubes 23, 23' are kept floating vertically by means of a float 40 fixed to the ends of the tubes 23, 23'. By raising the float collar 2, the tubes 23, 23' could be fetched, and connected to the control unit 17 for further raising by air charging the tubes 23 and 24. As soon as the air inflow is started, the air charging side of the float collar 2 will first emerge from the water. The opposite side of the float collar 2 will be suspended from the floats 21 via the supporting ropes 20 and the cross feet 19, until enough air is introduced in the rings 3, 4 of the float collar 2.

Figure 12:
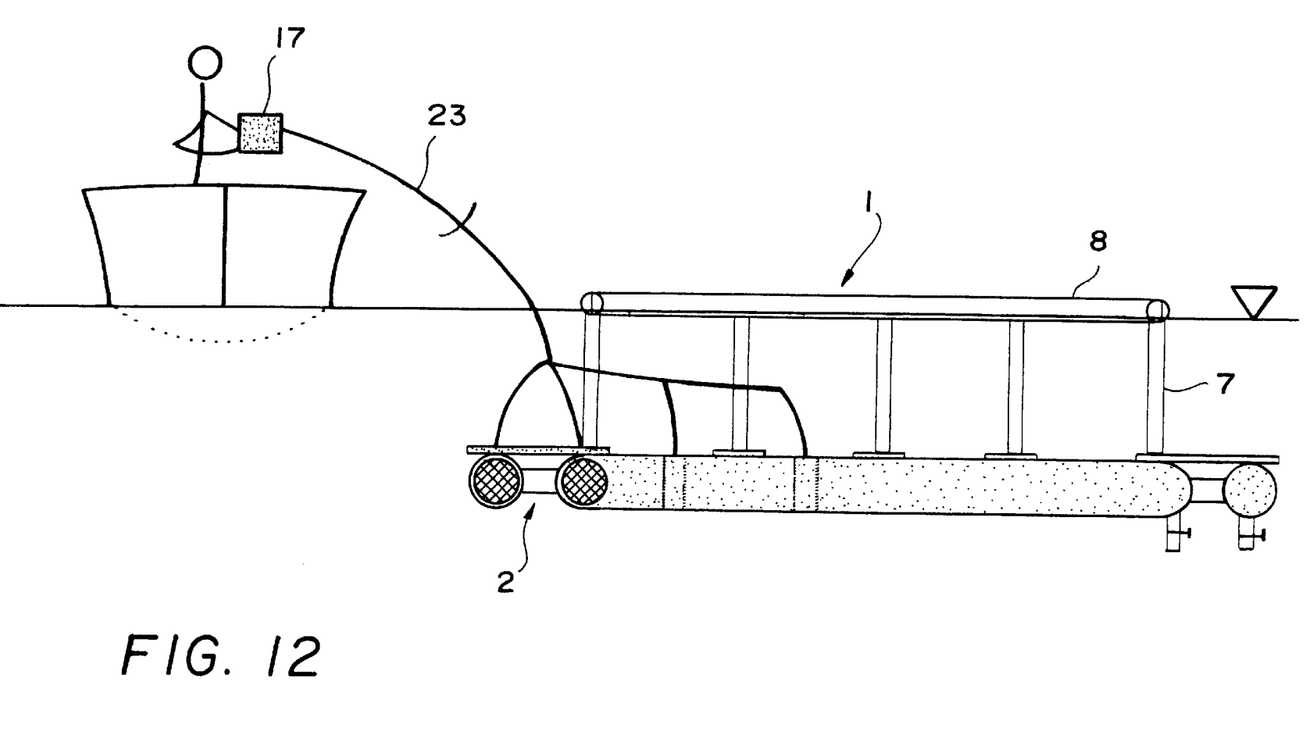
FIG. 12 shows the rearing unit submerged in order to prevent icing.

FIG. 12 shows a use of the present invention for avoiding problems associated with ice. The jumping fence 7 is not perforated as described above. The jumping fence 7 can then function as a float for the whole float collar 2. When the cold period has passed, the float collar can be raised from the water and normal operation can continue.

Figure 13:
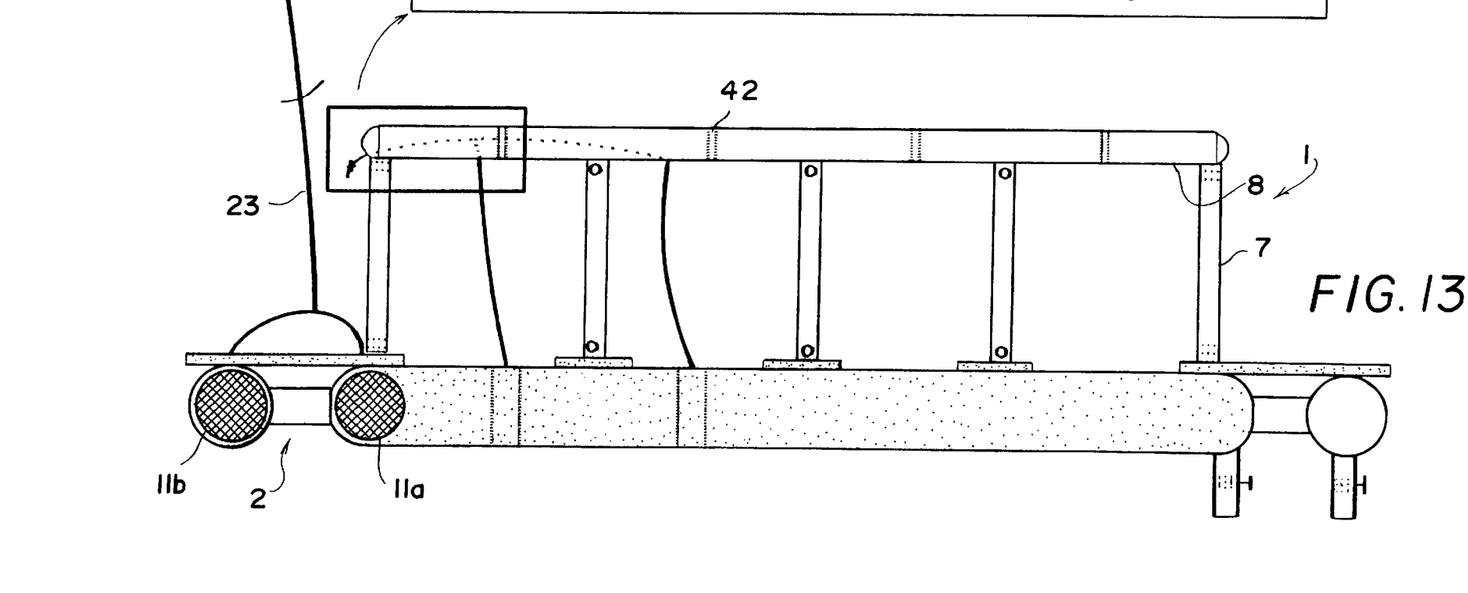
FIGS. 13 and 14 show an alternative air relief means for use in the rearing unit.
Figure 14:
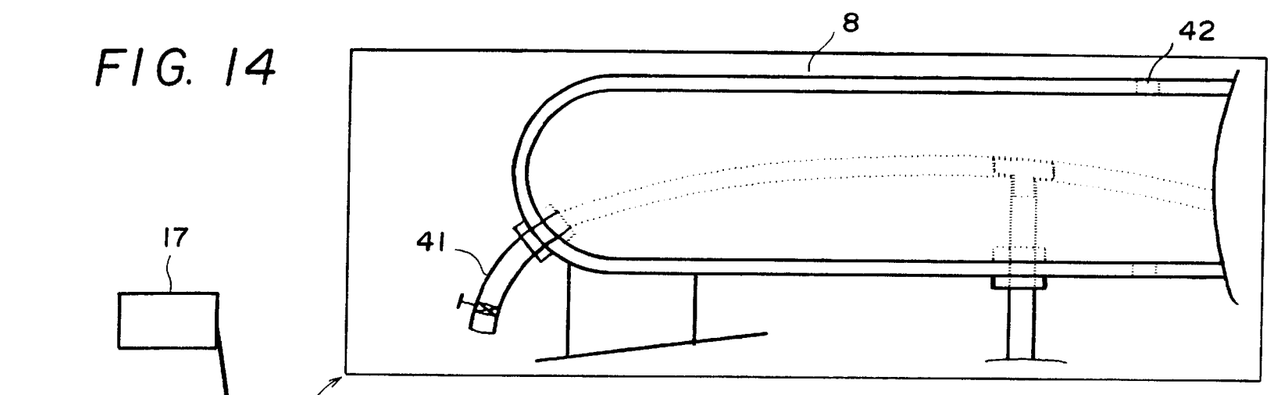

FIG. 13 shows a connection for emptying water laterally using the air relief means 11, by using a side air relief valve 41. FIG. 14 shows in detail how the side air relief can be placed in the hand rail 8.

On commencing lowering of the float collar 2, the valve 41 is opened simultanous with the valves of the control unit 17. When the float collar 2 is about to submerge, the valve 41 is closed. The rest of the air is let out through the control unit 17. In order to submerge the float collar 2, it is necessary to empty air from the jumping fence 7 and the hand rail 8. This is done through perforations 42.

We claim:

1. A device for lowering and raising a rearing unit, said rearing unit being provided with a float collar comprising an inner and an outer floating ring which floating rings have hollow interiors, and are normally water tight, so that the rearing unit floats on the water surface, and at least one of the floating rings is equipped with at least one fluid tight partition wall, at least a first air leading means and a second air leading means are arranged on at least one of the floating rings in order to let air out of the floating rings as they are lowering, and into the floating rings as they are raising, which air leading means are connected to at least a first connecting tube, arranged to lead the air respectively from and to the floating rings, and the floating rings are equipped with water filling openings, characterized by water control means for the introduction and removal of water at the water filling openings, said water control means having a valve mechanism, said water control means being situated on the inner and outer floating rings, respectively, so that water can be let into the floating rings for lowering, and out of the floating rings for raising, as air pockets are formed between admitted air and the at least one partition wall, a second connecting tube is arranged to lead the air respectively from and to the floating rings, wherein the first connecting tube is connected to a first air pocket and the second connecting tube is connected to a second air pocket, and that the first air leading means and second air leading means are situated in a mirror symmetric manner about a diametral axial plane through the at least one partition wall and the water control means.

2. A device according to claim 1, characterized by third air leading means arranged respectively both on said inner and outer floating rings at a distance from the first air leading means, wherein the number of air leading means and mutual distances between the air leading means are determined by the diameter of the float collar.

3. A device according to claim 2, characterized by fourth air leading means arranged in mirror symmetry in relation to the third air leading means, wherein the axis of symmetry passes through the at least one partition and the water control means.

4. A device according to claim 3, characterized by the first connecting tube being connected to the air leading means on one side of the symmetry axis, and the second connecting tube being connected to the air leading means on the other side of the symmetry axis, and a control unit with valving means for controlling flow through the connecting tubes to control the ratio of water to air in each of the air pockets.

5. A device according to claim 4, characterized by the control unit further comprising a common valve and an air relief valve.

6. A device according to claim 5, characterized by the valve mechanism comprising flexible hoses on the water control means, which hoses are arranged during normal operation to be dragged on the surface, and during water inflow being submerged under the water surface, preferably by means of weights.

7. A device according to claim 5, characterized by the valve mechanism comprising a closure on a pipe socket.

8. A device according to claim 1, characterized by the valve mechanism comprising flexible hoses on the water control means, which hoses are arranged during normal operation to be dragged on the surface, and during water inflow being submerged under the water surface, preferably by means of weights.

* * * * *